Figure 3:
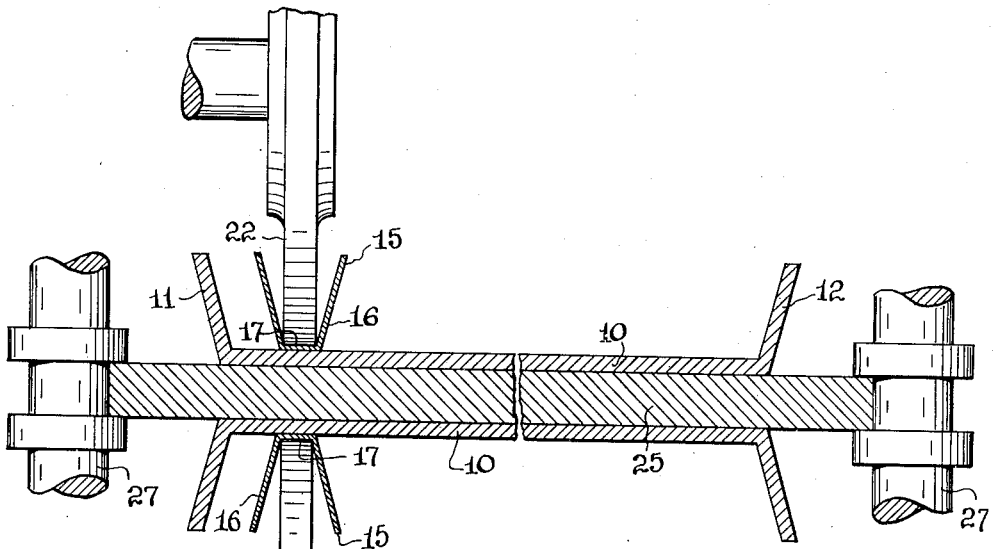

June 21, 1949.  J. W. BROWN, JR  2,473,634
ELECTRIC RESISTANCE WELDING METHOD
Filed July 15, 1947

INVENTOR.
JOHN W. BROWN, JR.
BY
Bosworth & Sessions
ATTORNEYS

Patented June 21, 1949

2,473,634

UNITED STATES PATENT OFFICE 2,473,634

ELECTRIC RESISTANCE WELDING METHOD

John W. Brown, Jr., Lakewood, Ohio, assignor to Brown Fintube Company, Elyria, Ohio, a corporation of Ohio Application July 15, 1947, Serial No. 761,115

2 Claims. (Cl. 219—10)

This invention relates to a method for welding fins and like thin steel members to a thicker steel plate or sheet, and more particularly to a method for simultaneously welding together two pairs of members each consisting of a fin and a plate, by a series of resistance welds formed during continuous relative motion of the fins and plates as a unitary assembly with respect to opposed roller welding electrodes.

In attempting to weld fins and like members to one side of a steel plate by means of conventional seam welding machines embodying roller electrodes difficulties frequently are incurred because the plate is burned and pitted on the side opposite the fins as a result of the concentration of welding current where one of the electrodes engages the plate. In passing a roller electrode over a steel plate the former tends to become fouled with steel picked up from the plate and must frequently be cleaned. According to the present invention, the above and other difficulties are eliminated and the welding operation is carried out expeditiously and efficiently in a conventional seam welder embodying vertically aligned roller electrodes by placing two steel plates back to back and separated by a plate of copper or other material of like softness and electrical properties and then placing the steel fins against the steel plates and engaging the fins by the respective electrodes. The two pairs of plates and fins and the intervening copper plate are clamped together as a unitary assembly and current passes from one to the other electrode through a fin and its associated steel plate and then through the copper to the other steel plate and its fin and then into the other electrode. The contact areas through which the welding current flows between the copper plate and the steel plates are large, thus eliminating excessive concentration of electric current and heat on the surfaces of the steel plates opposite the surfaces which are being welded to the fins. Burning and pitting of the undersides of the plates by the welding current are thus effectively prevented.

The general object of the invention is to provide an improved method of simultaneously forming welds between two members of one pair and another weld between two members of another pair of metal members with a single pair of roller welding electrodes. Another object of the invention is to provide an improved method of simultaneously welding two thin steel fin members to two thicker steel plate members respectively without unduly burning or pitting the plate members along the region of the welds. Another object is the provision of such a method which can be carried out in a conventional seam welder having two substantially identical roller electrodes. A still further object of the invention is to provide such a method in which the fins, steel plates and a copper backing plate are moved continuously as an assembly relative to a pair of roller electrodes during a substantially continuous welding operation. Other objects of the invention will become apparent from the following description and the attached drawing. The novel features of the invention are summarized in the claims.

Figure 2:
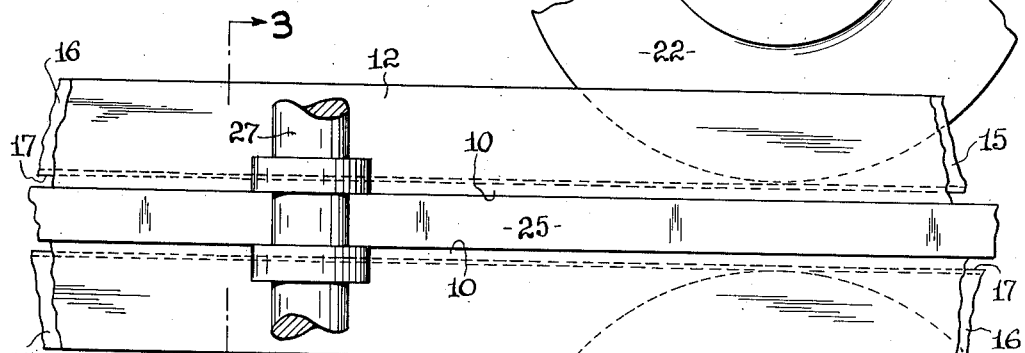
Figure 1:
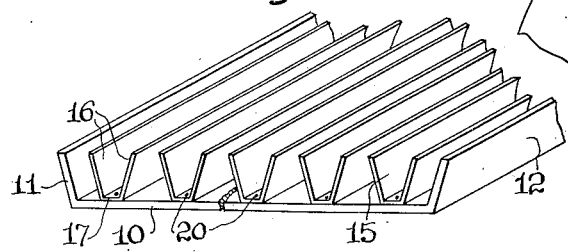

In the drawings: Figure 1 is an end elevation of a group of fins welded to a plate in accordance with the present invention; Figure 2 is a side elevation showing an assembly of two fins, two steel plates and a copper plate between the steel plates all positioned between the roller electrodes used in the welding operation and Figure 3 is a section through Figure 2 as indicated by the lines 3—3 thereon.

In Figure 1 there is illustrated one form of structure whose parts may be welded together by the method of the present invention, although it will be apparent other shapes may be secured together in like manner within the scope of this invention which is limited solely by the appended claims. The assembly illustrated comprises a plate 10 which is part of a steel channel unit having sides 11 and 12 forming the exterior wall of a conduit of a heat exchanger of a type disclosed and claimed in my copending application Serial No. 740,598. Inside of the channel shaped portion and secured to the flat bottom thereof are a series of sheet steel heat conducting fins 15 in the form of channels having flanges 16 and bottoms 17. Complementary faces of each of the bottoms 17 and of the plate 10 are secured together by a series of resistance welds 20 (Figure 1).

The welds 20 are formed as a series by the use of continuously rotating vertically aligned roller electrodes 22 and 23 mounted on parallel axes and adapted to clamp between them with appropriate resilient welding pressure two fins 15 and two plates 10 as shown in Figures 2 and 3. Interposed between the two steel plates 10 is a copper plate 25 that forms no part of the completed and welded unit but is used as a tool in conjunction with the rollers 22 and 23 properly to distribute current to the region of the welds.

As an example of a procedure which I have found to be satisfactory in welding low carbon steel channel section fins 15 of a thickness of about .031 inch to a low carbon steel 12 gauge plate 10; the bases of two channel members consisting of an assembly as outlined above are engaged with electrodes 22 and 23 each having a width approximately equal to the width of a channel base with an electrode pressure of 900 to 1000 pounds. The current employed is alternating current at about 12000 amperes and six to eight volts. A weld is made between each pair of fins and plates simultaneously with a duration of current of three cycles of sixty cycle, single phase, alternating current, the current being shut off between welding periods for a period of three cycles between welds. The fins are welded to the plate at a speed of eighteen to twenty feet per minute. Under these conditions the sides of the plates 10 opposite the fin are discolored, but are not unduly pitted or weakened.

The fins 15, plate 10 and copper plate 25 are held as an assembly with respect to each other by any suitable clamping means and the assembly is guided between the eelctrode rollers 22 and 23 by engagement of the edges of the plate 25 with three pairs of grooved rollers 27. The manner of supporting and guiding the assembly is illustrative only and is not to be regarded as limiting the scope of the invention. During the welding operation the rollers 22 and 23 are urged toward each other with the appropriate welding pressure to clamp between them the bases 17 of the fins 15, the plates 10 and the copper plate 25.

The welding pressure used is sufficient to force the plates 10 and the soft copper plate 25 together in firm electrical contact over a relatively large area, much greater than the area that would be afforded by the line contact between an electrode roller and a plate 10 if no copper plate 25 was interposed between them. The copper plate is an excellent conductor and current may travel between steel plates 10 and copper plate 25 throughout a substantial area; this distribution of current eliminates concentration of the current and provides a path of low resistance. As a result the outer surfaces of the plates 10 in contact with the copper plate 25 do not become heated to a sufficiently high temperature to be pitted or otherwise deformed with resultant destruction of the desired finished surface.

Current travels between the fins 15 and the welding electrodes in such manner that there is no appreciable harmful effect on the surface of either. The copper, being relatively soft, deforms under the pressure of the electrodes and the area of contact between the plates 10 and the copper plate 25 is increased by this deformation, thus reducing the resistance to flow of current between the electrodes and minimizing the heating effect.

After an assembly comprising two fins 15, two plates 10 and copper plate 25 has been moved between the pair of roller welding electrodes from one end to the other, a succeeding fin is clamped in place against each plate 10 and the newly formed assembly is moved transversely to the electrode rollers so they will traverse the region in which the series of welds between the succeeding fins and plates are to be made. In most cases, and particularly when the adjacent fins of each plate are parallel to each other, one fin will be welded in place as the assembly traverses the rollers in one direction and the succeeding fin will be welded in place during the return travel.

From the foregoing description it will be evident that I have provided an improved method of welding together relatively thin fins and sheets without causing any burning or pitting of the exposed surfaces where the welding current leaves the assembly. My method can be carried out in any conventional seam welder of appropriate capacity and embodying aligned electrode rolls, without requiring expensive additional equipment. The method can be carried out rapidly at relatively low cost, thus making possible the rapid and economical production of finned plates and the like.

Those skilled in the art will recognize that the method set forth in the appended claims may be practiced with apparatus embodying differences over that shown herein without departing from the scope of this invention.

I claim:

1. The method of simultaneously forming a weld between two members of one pair of metal members and another weld between two members of another pair of metal members with a single pair of roller welding electrodes to provide a series of individual spot welds including the steps of forming an assembly comprising the two pairs of members to be welded with one pair separated from the other by a highly current conductive metal plate having a substantial area of contact with each adjacent member and so positioned that the regions to be welded in each pair and the plate are in transverse alignment, positioning a roller welding electrode on each side of said assembly so each electrode makes rolling contact with one outer member of a pair at the region of the respective welds, engaging the edges of said plate with a plurality of guide rollers to guide the plate parallel to the plane of the electrode rollers, moving said rollers and said assembly relative to each other to cause the electrode rollers to traverse the regions to be welded and intermittently passing a welding current from one electrode roller to the other through said assembly to form a line of spot welds in the welded regions.

2. The method of simultaneously forming a weld between two members of one pair of ferrous metal members and another weld between two members of another pair of ferrous metal members with a single pair of roller welding electrodes to provide a series of individual spot welds, including the steps of forming an assembly comprising the two pairs of members to be welded with one pair separated from the other by a metal plate composed of a metal having substantially the current and heat conductive properties and softness of copper so positioned that the regions to be welded in each pair and the approximate center of the plate are in transverse alignment, positioning a roller welding electrode on each side of said assembly so each electrode makes rolling contact with one outer member of a pair at the region of the respective welds and the electrode rollers lie in substantially the same plane transverse to said plate, engaging the edges of said plate with a plurality of guide rollers to guide the plate parallel to the plane of the electrode rollers, resiliently urging said electrode rollers toward each other to apply welding pressure to the assembly, moving said rollers and said assembly relative to each other to cause the electrode rollers to traverse the regions to be welded and intermittently passing a welding current from one electrode roller to the other through said assembly to form a line of spot welds in the welded regions.

JOHN W. BROWN, Jr.

REFERENCES CITED

The following references are of record in the file of this patent:

UNITED STATES PATENTS

| Number | Name | Date |
|---|---|---|
| 1,001,049 | Knipe | Aug. 22, 1911 |
| 2,057,017 | DeGanahl | Oct. 13, 1936 |
| 2,263,038 | Heim | Nov. 18, 1941 |
| 2,304,976 | Watter | Dec. 15, 1942 |

FOREIGN PATENTS

| Number | Country | Date |
|---|---|---|
| 877,233 | France | Sept. 1, 1942 |